United States Patent
DiStasio

(10) Patent No.: US 9,696,421 B2
(45) Date of Patent: Jul. 4, 2017

(54) THROUGH WALL SENSING SYSTEM USING WIFI/CELLULAR RADAR

(71) Applicant: SRC, Inc., North Syracuse, NY (US)

(72) Inventor: Marcello M. DiStasio, Syracuse, NY (US)

(73) Assignee: SRC, Inc., North Syracuse, NY (US)

( * ) Notice: Subject to any disclaimer, the term of this patent is extended or adjusted under 35 U.S.C. 154(b) by 59 days.

(21) Appl. No.: 14/199,205

(22) Filed: Mar. 6, 2014

(65) Prior Publication Data

US 2014/0269384 A1      Sep. 18, 2014

Related U.S. Application Data

(60) Provisional application No. 61/800,449, filed on Mar. 15, 2013.

(51) Int. Cl.
*G01S 13/88* (2006.01)

(52) U.S. Cl.
CPC .................. *G01S 13/888* (2013.01)

(58) Field of Classification Search
None
See application file for complete search history.

(56) References Cited

U.S. PATENT DOCUMENTS

| | | |
|---|---|---|
| 7,272,394 B2 | 9/2007 | Krishnakumar et al. |
| 7,940,715 B2 | 5/2011 | DiStasio et al. |
| 2010/0292568 A1 | 11/2010 | Droitcour et al. |
| 2011/0102234 A1 | 5/2011 | Adams et al. |
| 2012/0146796 A1 | 6/2012 | Margon et al. |
| 2013/0113647 A1* | 5/2013 | Sentelle ............... G01S 13/888 342/22 |

OTHER PUBLICATIONS

Chetty et al. "Through-the-Wall Sensing of Personnel Using Passive Bistatic WiFi Radar at Standoff Distances," IEEE Transaction on Geoscience and Remote Sensing, Apr. 2012. vol. 50, No. 4, p. 1218-1226. http://ieeexplore.ieee.org/xpl/articleDetails.jsp?arnumber=6020778.
Coldewey. "Wi-Fi Radar Spots Motion Through Walls With Help of Home Router," NBC News, Aug. 2, 2012. http://www.nbcnews.com/technology/futureoftech/wi-fi-radar-spots-motion-through-walls-help-home-router-922276.
Colone. "WiFi-Based Passive Bistatic Radar: Data Processing Schemes and Experimental Results," IEE Transactions on Aerospace and Electronic Systems, Apr. 2012. vol. 48, No. 2, p. 1061-1079. http://ieeexplore.ieee.org/xpl/articleDetails.jsp?arnumber=6178049.
Hambling. "Seeing Through Walls With a Wireless Router," Popsci.com, Aug. 1, 2012. http://www.popsci.com/technology/article/2012-07/seeing-through-walls-wireless-router.

* cited by examiner

*Primary Examiner* — Diane Lo
(74) *Attorney, Agent, or Firm* — Bond Schoeneck & King, PLLC; Blaine Bettinger; George McGuire

(57) ABSTRACT

A handheld through-wall sensing system comprising a transmitter/receiving operating at wireless data or cellular transmission frequencies. The system is operated in a monostatic radar mode with transmission occurring on frequency $f_o$ and reception on a predetermined bandwidth centered on $f_o$. The system may be operated on a pulsed or pseudo "half duplex" mode and have a transmit/receive pattern that is a function of the desired minimum stand-off distance.

14 Claims, 5 Drawing Sheets

THROUGH WALL SENSING SYSTEM USING WIFI/CELLULAR RADAR

CROSS-REFERENCE TO RELATED APPLICATIONS

The present application claims priority to U.S. Provisional Application No. 61/800,449, filed on Mar. 15, 2013.

BACKGROUND OF THE INVENTION

1. Field of the Invention

The present invention relates to handheld through-wall sensing systems and, more particularly toward through-wall sensing using wireless and cellular network signals.

2. Description of the Related Art

Conventional handheld systems for through-wall detection are usually based on the use of specialized radiation, such as radar or terahertz waves, which are beamed through a target wall so that the presence and location of any objections on the other side of the wall may be determined based on the returned signals. Such approaches require sophisticated transmission antenna and processing equipment that can reveal the presence of the user of the system.

Other systems rely on the use of existing radiofrequency signals, such as wireless internet or cellular transmissions, which may already be present inside a location. Although these systems are useful for inferring the presence and location of objects within the location based on the effect on the existing transmissions, these systems are passive and thus depend on the presence of an active transmitter within the location to be interrogated.

BRIEF SUMMARY OF THE INVENTION

It is therefore a principal object and advantage of the present invention to provide a through-wall sensing system that can be implemented using cellular and wireless transmission frequencies.

In accordance with the foregoing objects and advantages, the present invention comprises a handheld through-wall sensing system having a transmitter/receiving operating at wireless data or cellular transmission frequencies. The system is operated in a monostatic radar mode with transmission occurring on frequency $f_o$ and reception on a predetermined bandwidth centered on $f_o$. The system may be operating on a pulsed or pseudo "half duplex" mode and have a transmit/receive pattern that is a function of the desired minimum stand-off distance.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
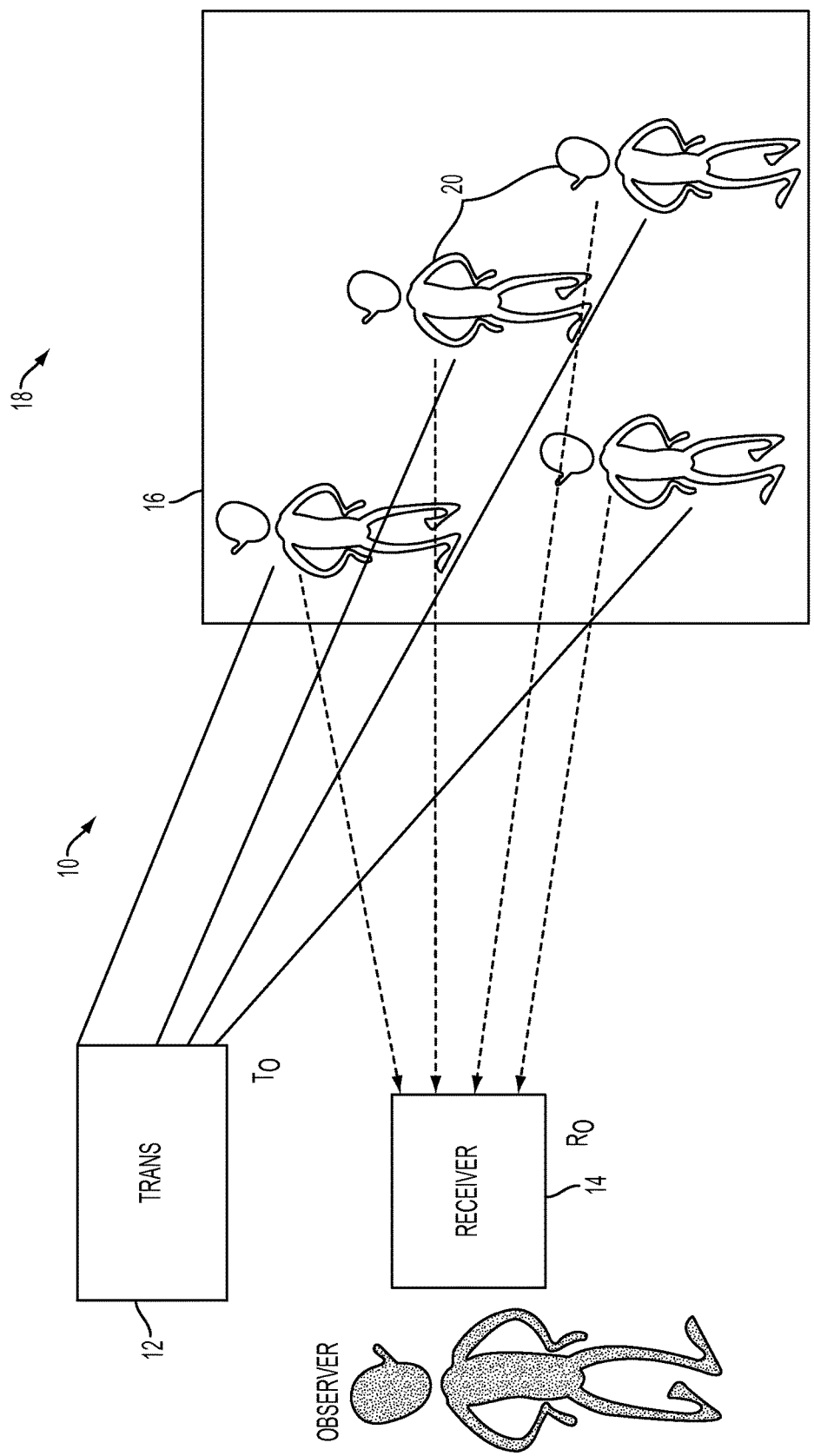
FIG. 1 is a schematic of a handheld wireless through-wall sensing system according to the present invention.

Referring now to the drawings, wherein like reference numerals refer to like parts throughout, there is seen in FIG. 1 a schematic of a handheld system 10 for through-wall detection. System 10 comprises a transmitter 12 that is the source of radiation, and a receiver 14 that captures any reflected signals. In a preferred embodiment, transmitter 12 and receiver 14 are configured to use the 802.11 (ISM Band 2400 MHz) type signals. These signals have been demonstrated to have the ability to propagate through the walls 16, such as those of a building 18 or other structure at a location, and provide information, such as an indication of the activity of one or more human beings 20 inside the building. Similar frequencies exhibit the comparable effects, such as conventional cellular telephone frequencies (1800 MHz and 900 MHz).

Figure 2:
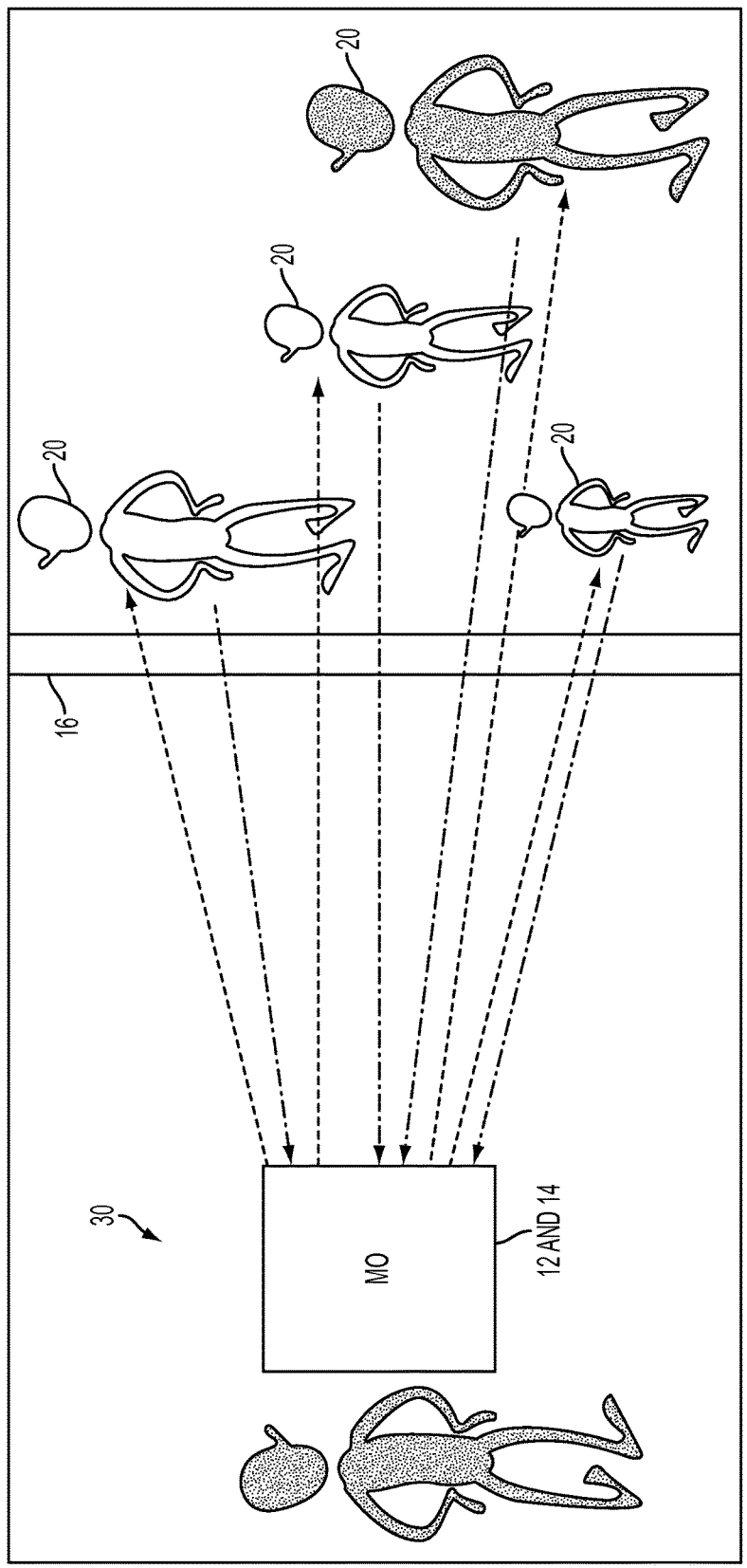
FIG. 2 is a schematic of a monostatic handheld wireless through-wall sensing system according to the present invention.

As seen in FIG. 2, the present invention may be configured as a monostatic system 30, i.e., transmitter 12 and receiver 14 are collocated. For a monostatic radar mode using wireless or cellular frequencies, transmission will occur on frequency $f_o$ and reception with by on a predetermined bandwidth centered on $f_o$. System 30 will operate on a pulsed or pseudo "half duplex" mode since it will not simultaneously transmit and receive. The transmit/receive pattern will be a function of the desired minimum stand-off distance. The transmit/receive pattern will have the same relationship as the pulse duration in conventional radar, where the length of the pulse determines how long before the receiver is activated.

Receiver 14 receives any reflected signals after they are transmitted uses the perturbations of the carrier signal to estimate a variance or entropy metric that is indicative of human activity on the other side of the wall. For example, signals may be processed using the entropic methods disclosed in U.S. Pat. No. 7,940,715, hereby incorporated by reference in its entirety.

Figure 3:
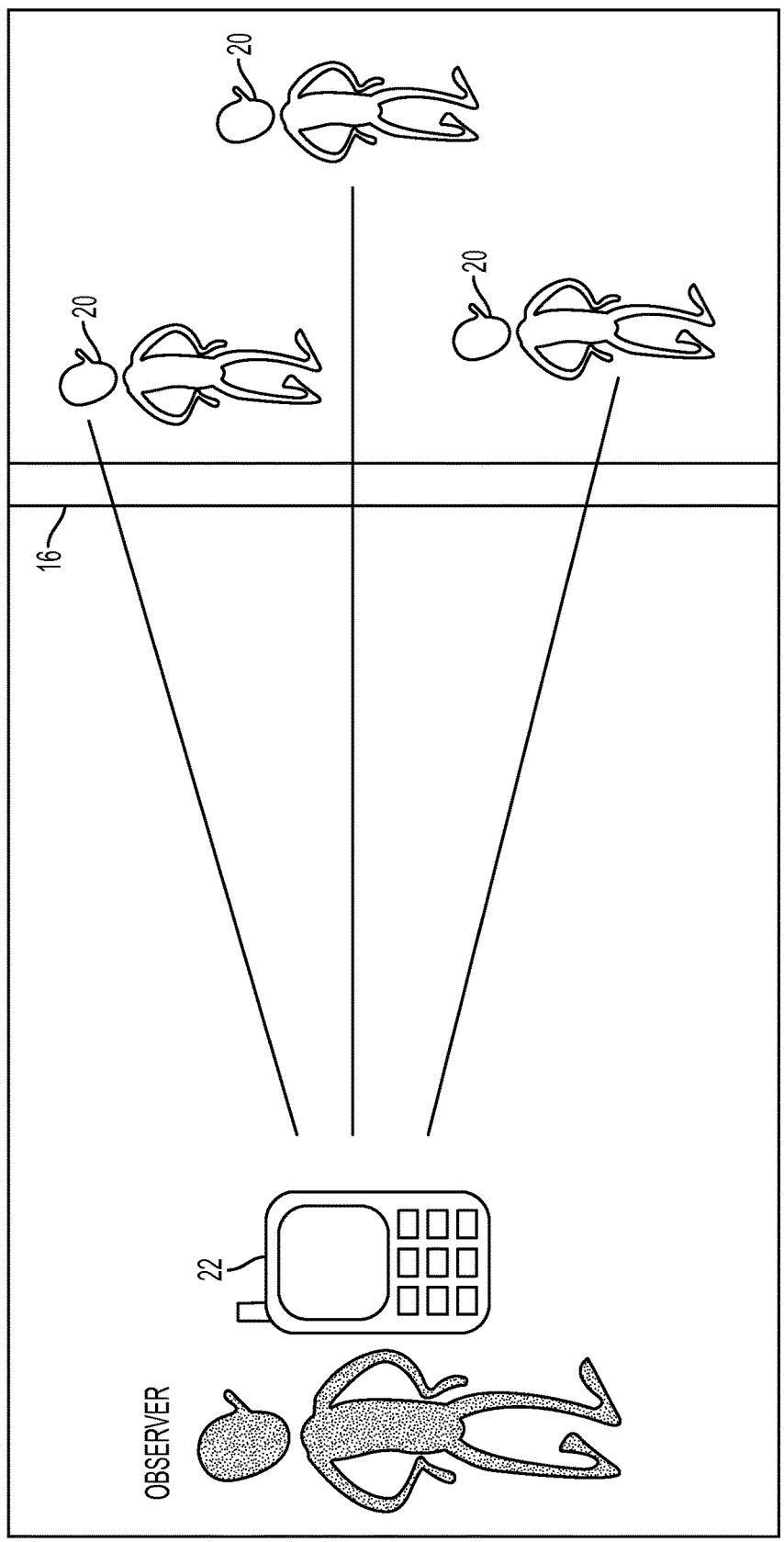
FIG. 3 is an additional schematic of a monostatic handheld wireless through-wall sensing system implemented in a handheld computing device according to the present invention.
Figure 4:
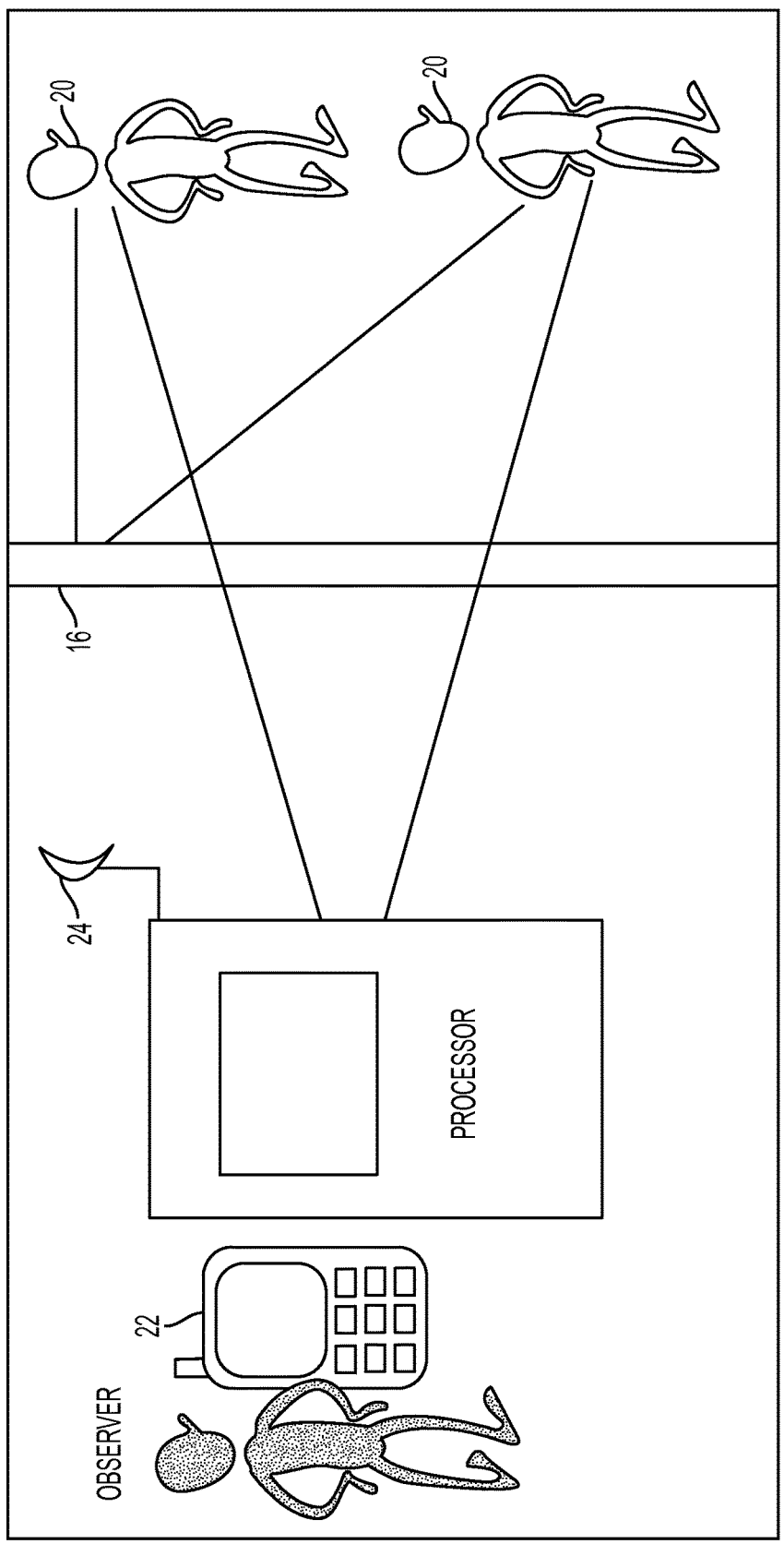
FIG. 4 is a schematic of a handheld wireless through-wall sensing system having a directional antenna according to the present invention.

Referring to FIG. 3, system 10 or 30 can be implemented using a smart phone or a tablet computer 22 (such as an Android or iOS device). In some applications or contexts, it may be desirable to employ an external, directional antenna 24, as seen in FIG. 4, and it may also be necessary to modify the device software for improved control of WiFi/cellular radar transmissions. For autonomous, local mode, the transmit/receive processing, activity, estimation, and display, all the functionality will be accomplished using only the resources available on the local device, e.g., smart phone, tablet computer, laptop, etc.

Figure 5:
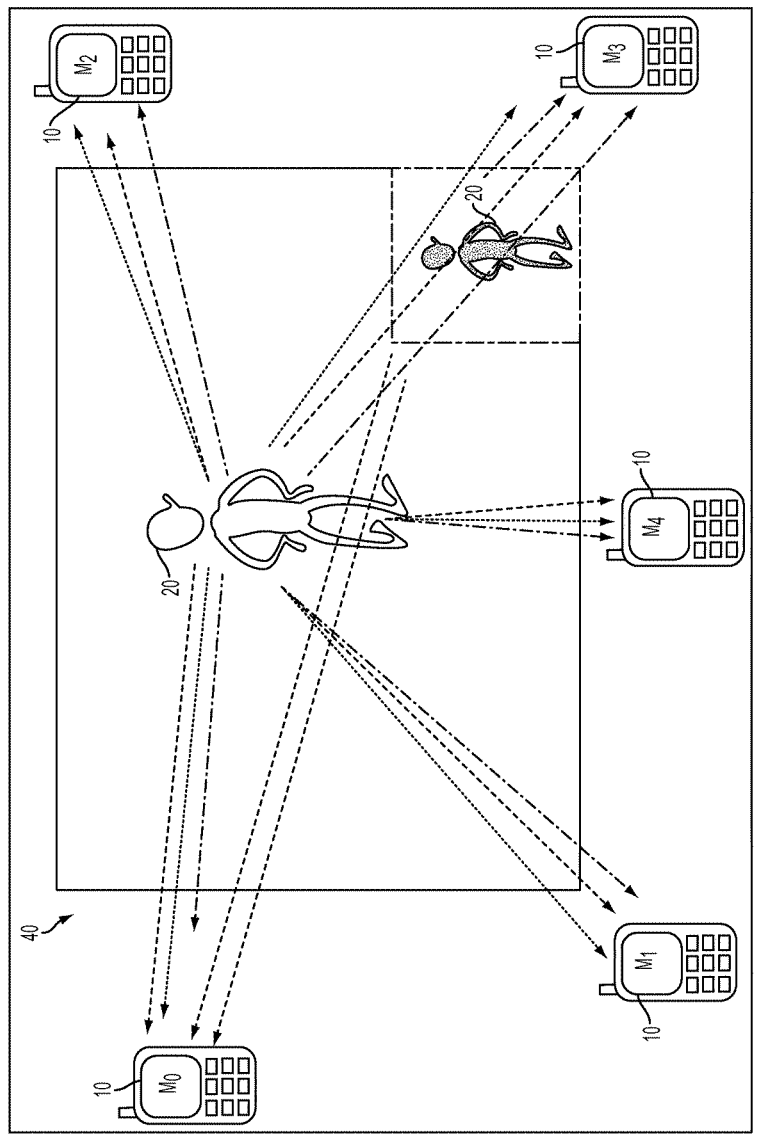
FIG. 5 is a schematic of a plurality of networked handheld wireless through-wall sensing systems according to the present invention.

Referring to FIG. 5, system 40 may comprise a networked mode where there are multiple sensors 30 (or 10) that coordinate their surveillance for expanded capability coordination in the channelized space is necessary. For example, system 40 designated as $M_i$ transmits and receives on channel $C_i$ and also receives (but does not transmit) on channel $C_k$. Each node $M_i$ acts as an active node on Channel $C_i$ and as a passive node on all other channels. This arrangement can provide higher accuracy and more precise location of target 20.

The present invention may further include a network service that the individual nodes measurements can use to upload to a more powerful, sophisticated processing platform. For example, the sampled data can be uploaded and analyzed by a central server or remote host service.

What is claimed is:

1. A through-wall sensing system, comprising:
    a first handheld computing device, the first handheld computing device comprising: (i) a transmitter for emitting radiation along a carrier signal having a predetermined first frequency; (ii) a receiver collocated with said transmitter for receiving signals in a predetermined channel surrounding said predetermined first frequency of said carrier signal; and a processor; and
    a second handheld computing device, the second handheld computing device comprising: (i) a transmitter for emitting radiation along a predetermined second carrier signal; (ii) a receiver collocated with said transmitter for receiving signals in a channel surrounding the predetermined first and second frequencies; and (iii) a processor;
    a third handheld computing device, the third handheld computing device comprising: (i) a transmitter for emitting radiation along a predetermined third carrier signal; (ii) a receiver collocated with said transmitter for receiving signals in a channel surrounding the predetermined first, second, and third frequencies; and (iii) a processor;
    wherein the receiver of the first handheld computing device is further configured to receive signals in a predetermined channel surrounding said predetermined second and third frequencies, and receiver of the second handheld computing device is further configured to receive signals in a predetermined channel surrounding said predetermined third frequencies, wherein said first, second, and third frequencies are different;
    wherein the processors of the first, second, and third handheld computing devices are configured to coordinate to determine the presence of human activity based on perturbations in said carrier signal;
    wherein said transmitters and receivers of the first, second, and third handheld computing devices are configured to operate in a half-duplex mode to emit said radiation and receive said signals in a pattern, said pattern being a function of a desired minimum stand-off distance.

2. The system of claim 1, wherein said predetermined first frequency is 2400 MHz.

3. The system of claim 1, wherein said predetermined first frequency is 1800 MHz.

4. The system of claim 1, wherein said predetermined first frequency is 900 MHz.

5. The system of claim 1, wherein said receiver is collocated with said transmitter.

6. The system of claim 1, wherein said transmitters and receivers are configured to operate in a pulsed mode.

7. The system of claim 1, where said perturbations are determined based on an entropy metric of said carrier signal.

8. The system of claim 1 further comprising a central server programmed to receive sensing data from each of said collocated transmitters and receivers and process said sensing data to identify any human activity.

9. A method of detecting the presence of human activity through a wall, the method comprising the steps of:
    providing a first handheld computing device;
    providing a second handheld computing device;
    emitting, with said first handheld computing device, radiation along a carrier signal having a predetermined first frequency from a first location;
    emitting, with said second handheld computing device, radiation along a carrier signal having a predetermined second frequency from a second location;
    receiving, with said first handheld computing device, signals in a predetermined first channel surrounding said predetermined first frequency and signals in a predetermined second channel surrounding said predetermined second frequency;
    receiving, with said second handheld computing device, signals in the predetermined first channel surrounding said predetermined first frequency and signals in the predetermined second channel surrounding said predetermined second frequency; and
    determining, by said first and second handheld computing device, the presence of human activity based on any perturbations in said received carrier signals;
    wherein said transmitters and receivers of the first, second, and third handheld computing devices are configured to operate in a half-duplex mode to emit said radiation and receive said signals in a pattern, said pattern being a function of a desired minimum stand-off distance.

10. The method of claim 9, wherein said predetermined first frequency is 2400 MHz.

11. The method of claim 9, wherein said predetermined first frequency is 1800 MHz.

12. The method of claim 9, wherein said predetermined first frequency is 900 MHz.

13. The method of claim 9, wherein said perturbations are determined based on variance in said carrier signal.

14. The method of claim 9, where said perturbations are determined based on an entropy metric of said carrier signal.

* * * * *